3,182,315
INTERROGATOR-RESPONDER SIGNALLING SYSTEM
Harold E. Sweeney, Menlo Park, Calif., assignor to General Precision, Inc., Binghamton, N.Y., a corporation of Delaware
Filed Nov. 24, 1961, Ser. No. 154,459
9 Claims. (Cl. 343—6.5)

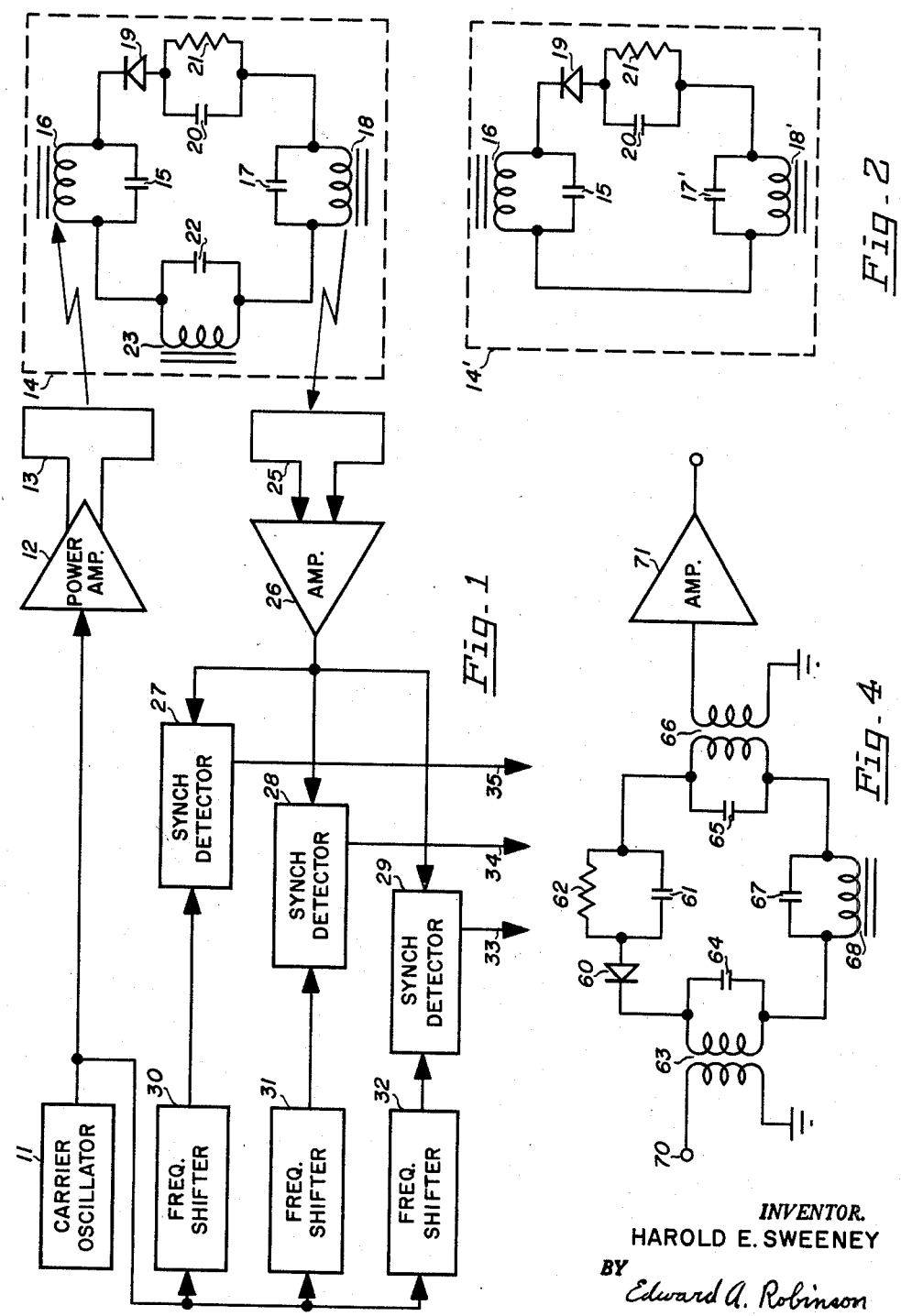
May 4, 1965     H. E. SWEENEY     3,182,315
INTERROGATOR-RESPONDER SIGNALLING SYSTEM
Filed Nov. 24, 1961     2 Sheets-Sheet 1
INVENTOR.
HAROLD E. SWEENEY
BY
*Edward A. Robinson*
ATTORNEY May 4, 1965
H. E. SWEENEY
3,182,315
INTERROGATOR-RESPONDER SIGNALLING SYSTEM
Filed Nov. 24, 1961
2 Sheets-Sheet 2
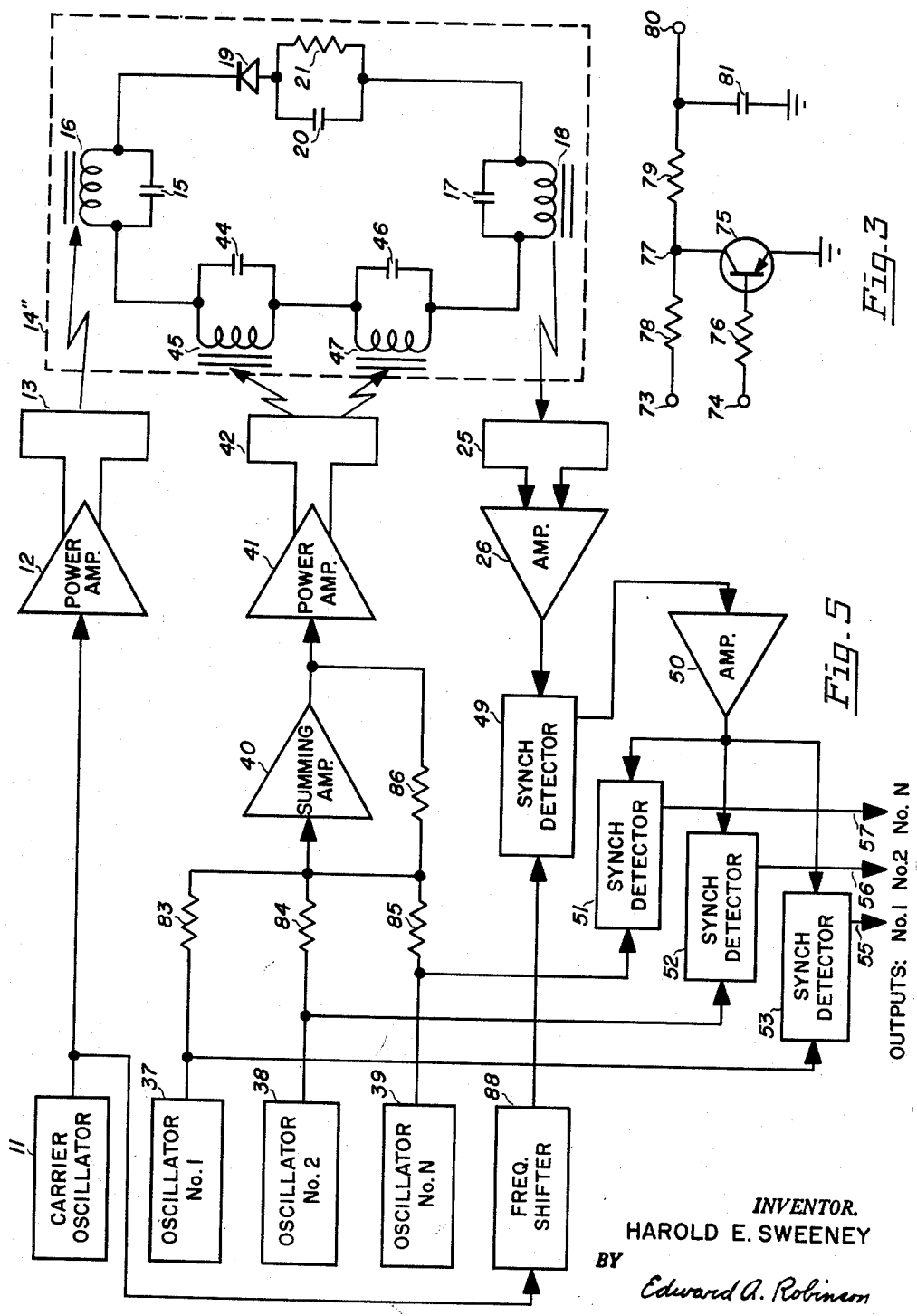
INVENTOR.
HAROLD E. SWEENEY
BY
Edward A. Robinson
ATTORNEY ID# United States Patent Office 3,182,315
Patented May 4, 1965

This invention relates to interrogator-responder signalling systems, and more particularly, to an improved system utilizing parametric oscillator circuits as passive responder devices which will receive an interrogator signal and will generate response signals of a frequency different from the interrogator signal.

A co-pending patent application, Serial No. 739,909 filed June 4, 1958, by Clarence S. Jones and entitled "Signalling System" now Patent No. 3,054,100 discloses an arrangement for electronically transmitting data between an interrogator device and one or more responder devices. The responder device may be carried by a vehicle along a route or track past one or more interrogator stations, and a coded response signal will be supplied to the interrogator station which is identifiable with a particular responder device and the vehicle carrying such device. For example, a city bus carrying a responder device or response block, may approach and pass over an interrogator location having inductive antenna loops embedded in the pavement of a street whereupon inductive elements in the responder device carried by a vehicle become magnetically coupled to a transmitter and a receiver at the interrogator location. A patent application, Serial No. 15,597 entitled "Signalling System" filed on March 17, 1960, by Robert A. Kleist, now Patent No. 3,036,295 discloses an interrogator responder system wherein an interrogation signal is generated by direct summation of a carrier frequency and a plurality of sideband frequencies. Both of these co-pending patent applications are assigned to the same assignee as the instant application.

In an interrogator-responder signalling system it is desirable that the responder device be passive such that it may operate without the use of any power source or power cells. In many applications, it may be desirable that the responder device be of small size and of light weight. It has been proposed to miniaturize a responder device to such an extent that it may be built into a badge to be worn by a person. Thus, the personnel of a military installation or the like may wear badges which are themselves responder devices and will provide coded electrical signals as each employee moves about through various interrogator locations or check points which may be positioned within door frames or other normal passageways. In such an installation the movements of personnel into and out of particular rooms may be electrically sensed and recorded.

It is an object of this invention to provide an improved method and means for interrogator-responder signalling wherein an interrogator signal of a first carrier frequency is received by a passive responder device which includes a parametric oscillator circuit to generate a response signal of another frequency, and wherein the response signal is received and synchronously detected by comparison with locally generated signals derived from the same interrogator carrier signal.

A further object of this invention is to provide an improved responder device, and more particularly, it is an object to provide such a device having a parametric oscillator therein using simpler and less expensive circuit components than prior responder devices and using components easily adaptable for miniaturization.

Numerous other objects and advantages will be apparent throughout the progress of the specification which follows. The accompanying drawings illustrate certain selected embodiments of the invention and the views therein are as follows:

FIGURE 1 is a circuit diagram of one form of the interrogator-responder system including a circuit diagram of the responder devices of this embodiment;

FIGURE 2 is a circuit diagram of a modified responder device which may be considered as a special case of the responder device shown in FIGURE 1;

FIGURE 3 is a schematic diagram of a synchronous detector circuit which is used in both the interrogator-responder systems of FIGURES 1 and 5;

FIGURE 4 is a schematic diagram of a frequency shifter circuit which is illustrated as simple blocks in FIGURE 1; and FIGURE 5 is a circuit diagram of another form of the interrogator-responder signalling system of this invention including a responder device having a modified parametric oscillator circuit.

Briefly stated, according to this invention, an interrogator-responder signalling system includes an oscillator 11 for generating an interrogator carrier signal, and a power amplifier 12 which amplifies and passes the carrier signal to a transmitter loop 13. As shown in FIGURE 1, the responder device 14 includes a first resonant circuit comprising a capacitor 15 and an inductor 16 connected in parallel and a second resonant circuit comprising a capacitor 17 and an inductor 18 also in parallel. The circuit 15–16 is tuned to the frequency of the interrogator carrier, and therefore, will pick-up energy when the inductor 16 moves into spaced relation with the loop 15 by magnetic coupling therebetween. The responder device includes a diode 19 coupled to a capacitor 20 and a resistor 21 and constituting a non-linear capacitance. A third tuned circuit including a capacitor 22 and an inductor 23 is tuned to an idler frequency. The three tuned circuits and non-linear capacitor constitute a parametric oscillator circuit wherein energy is pumped from the circuit 15–16 to cause resonant oscillation in the circuit 17–18 for generating a response signal. The response signal from the circuit 17–18 is received by a receiver loop 25 and passed by an amplifier 26 to synchronous detector circuits 27, 28 and 29. The interrogator carrier signal from the oscillator 11 is impressed upon frequency shifting circuits 30, 31 and 32. An output signal will appear at a selected one of the output leads 33, 34 and 35 depending upon a matching of the frequencies produced by the resonant circuit 17–18 of the responder device 14 and a particular one of the frequency shifting circuits 30, 31 and 32.

According to another form of this invention shown by FIGURE 5, a plurality of low frequency signals are generated by oscillator circuits 37, 38 and 39; are combined by a summing amplifier 40; and are passed by a power amplifier 41 to another transmitting loop 42. A capacitor 44 and an inductor 45 comprise a tuned circuit having a resonant frequency of a selected one of the sub-carrier signals; and another capacitor 46 and an inductor 47 comprise yet another tuned circuit resonant to another selected one of the sub-carrier frequencies. The sub-carrier signals from the oscillators 37, 38 and 39 may be of substantially lower frequency than the carrier signal of the oscillator 11 and a parametric oscillator circuit 14" will provide a response signal of the resonant frequency of the tuned circuit 17–18 and modulated by the frequencies picked-up by the selective tuned circuits 44–45 and 46–47. The modulated response signal is received by an inductive loop 25; is passed by the amplifier 26 to be de-modulated by the synchronous detector circuit 49 to obtain those two sub-carrier frequencies selected by the tuned circuits 44–45 and 46–47 of the particular responder device 14″. The sub-carrier frequencies from the synchronous detector circuit 49 are passed by an amplifier 50 to further synchonous detector circuits 51, 52 and 53. Those sub-carrier frequencies which were selected by the circuits 44–45 and 46–47 will cause selected outputs at terminals 55, 56 or 57.

The interrogator-responder signalling system illustrated by FIGURE 1 utilizes a responder device or response block which receives the carrier frequency and develops a response signal at a selective frequency which uniquely identifies the responder device. The parametric oscillator circuit of the responder device includes three parallel tuned circuits connected in series with a non-linear capacitance. The "Theory of Parametric Amplification Using Non-Linear Reactances" has been disclosed in an article of this title by S. Bloom and K. K. N. Chang in the RCA Review, December 1957 issue beginning on page 578. Another article by the same authors entitled "Parametric Amplifier Using Lower-Frequency Pumping" appears in the Proceedings of the IRE, July 1958 issue beginning on page 1383. These articles provide a complete analysis of a parametric circuit having a non-linear inductive reactance connected in parallel with three series resonant networks. The circuit shown as the responder device 14 is the opposite or dual circuit having parallel resonant networks connected in series with a non-linear capacitive reactance; and the mathematical analysis by the authors Bloom and Chang may be applied to this dual circuit. Although the theory of parametric amplification and oscillation is fully developed by the articles of Bloom and Chang, the following brief description may be helpful in gaining an understanding of the instant invention.

During the first few cycles when the tuned circuit 15–16 receives energy by magnetic coupling with the loop 13, a direct current path will exist through the three tuned circuits and the diode 19 whereupon the carrier signal will be rectified and the capacitor 20 will accumulate charge. The value of the capacitor 20 and the ohmic value of the resistor 21 are so chosen that the charge will not leak off from the capacitor 20 through the resistor 21 by any appreciable amount during a single cycle of the interrogator carrier signal. Therefore, after the first few cycles, the capacitor 20 will remain in a charged condition and will apply a back bias to the diode 19. During most of the cycle of each carrier wave the diode 19 remans cut off and back biased and as such will exhibit the properties of a non-linear capacitor which varies in capacitance value in accordance with the applied voltage. The diode 19 is directly coupled to the capacitor 20 and the resistor 21, and the three elements together will effectively constitute a non-linear capacitive reactance which varies in accordance with the voltage applied thereto.

As disclosed by the authors Bloom and Chang, the non-linear reactance element will affect all three of the tuned circuits 15–16, 17–18 and 22–23 coupled thereto. The circuit 15–16 pumps energy to the other two tuned circuits according to the parametric theory of amplification. As the circuits are set up in the responder device 14, parametric amplification will exist if the sum of the resonant frequency of the second tuned circuit 17–18 (the response frequency $f_r$) and the resonant frequency of the third tuned circuit 22–23 (the idler frequency, $f_i$) is equal to the resonant frequency of the circuit 15–16 (the pump frequency, $f_p$). Thus, $$f_p = f_r + f_i$$

Oscillation will occur if the equivalent negative resistances developed across tuned circuits 17–18 and 22–23 are less than the equivalent positive resistances which reflect actual circuit losses.

Obviously, with a given carrier frequency to which the circuit 15–16 is tuned, various response frequencies may be developed by selection of the parameters of the two tuned circuits 17–18 and 22–23. Thus, various combinations of response frequencies $f_r$ and idler frequencies $f_i$ may be utilized as long as the sum of the two frequencies remains equal to the carrier or pump frequency $f_p$. While the inductances 16 and 18 may each be wound about a straight cylindrical ferrite core to provide a magnetic coupling with the interrogator loops 13 and 25, the inductance 23 may be wound upon a torroid core thereby eliminating any possibility of a magnetic coupling between the loops and inductor 23. FIGURE 2 illustrates a simplification of the response circuit 14 of FIGURE 1 for a special case wherein the response frequency $f_r$ equals ½ the carrier or pump frequency $f_p$. Each of the parallel tuned circuits presents a high impedance to the particular resonant frequencies thereof. In the general case of the parametric oscillator 14, FIGURE 1, the tuned circuit 22–23 presents a high impedance to an idler frequency while the tuned circuit 17–18 presents a high impedance to the response frequency. In the special case of FIGURE 2 the response frequency equals the idler frequency, and such being the case, it is not necessary to provide a special tuned circuit for the idler frequency since the circuit 17′–18′ will perform both as the idler circuit and the response circuit by presenting a high impedance to the common idler and response frequencies $f_i$ and $f_r$.

The system disclosed in FIGURE 1 essentially provides an interrogator carrier signal which is shifted to a different frequency by the response device to generate a selected response signal. The carrier frequency is generated by the oscillator 11 which may be any conventional oscillator circuit. One such oscillator circuit which may be used is disclosed by a co-pending patent application by Clarence S. Jones and John Scarbrough, Serial No. 15,914 entitled "Crystal Controlled Transistorized Oscillator" filed March 18, 1960. The interrogator station includes frequency shifting circuits 30, 31 and 32 coupled to receive the carrier frequency from the oscillator 11, and operable to generate a plurality of possible response signals each related to the carrier frequency in both frequency and phase. Each of the frequency shifting circuits 30, 31 and 32 may be quite similar to the response circuit 14 shown by FIGURE 1. Thus, the frequency shifting circuit shown in FIGURE 4 may be another parametric oscillator circuit including a non-linear capacitive reactance provided by a diode 60, a capacitor 61 and a resistor 62, having the same configuration and function as the elements 19, 20 and 21 of the responder device 14. The first tuned circuit which is resonant at the pump or carrier frequency $f_p$ includes a transformer 63 and a capacitor 64. The second tuned circuit which is resonant at a particular one of several possible response frequencies includes a capacitor 65 and a transformer 66. A third tuned circuit may be included having a capacitor 67 and an inductive reactance 68 to be resonant at an idler frequency $f_i$. To preserve the accuracy of the resonant frequencies to which the circuits 63–64 and 65–66 are tuned, the transformers 63 and 66 may have loose coupling characteristics such that the resonant frequencies will not be adversely affected by circuitry coupled thereto through the transformer windings. An input terminal 70 receives the interrogator carrier signal from the oscillator 11 (FIGURE 1) which is inductively coupled to the tuned circuits 63–64.

For ease of understanding this invention, FIGURE 1 shows only three frequency shifting circuits 30, 31 and 32, which may produce a corresponding three possible response frequencies. It will be understood that any practical interrogator-responder system may include further requency shifting circuits to generate to the possible response frequencies. The circuit of FIGURE 4 may be modified somewhat to produce two response frequencies simultaneously whereby the system may be expanded without greatly increasing the complexity thereof. Thus, the inductor 68 of the resonant circuit 67–68 may be provided with a secondary winding such that the idler frequency may be passed to an amplifier and output terminal. In this case, the carrier frequency applied to the input terminal 70 will be used to simultaneously generate two possible response frequencies from both the resonant circuits 65–66 and 67–68.

The circuit of FIGURE 4 may be considered to be the equivalent of the response circuit 14 of FIGURE 1 when it is appreciated that the inductive coupling between the loop 13 and the inductance winding 16 is the equivalent of the transformer 63, and the inductive coupling between the loop 25 and the inductance winding 18 is equivalent to the transformer 66. The frequency shifting circuits 30, 31 and 32 may each be considered to include an amplifier 71 for amplifying the output signal therefrom such that the signal impressed upon the synchronous detector circuits 27, 28 and 29 will be of a suitable level or intensity.

From the foregoing, it may be appreciated that the various frequency shifting circuits 30, 31 and 32 generate the possible response signals in the same manner that the responder device generates a selected one of the response signals. Thus, when a responder device 14 moves into the inductive fields of the loops 13 and 25, a response signal of a selected one of the possible frequencies is impressed on all of the synchronous detector circuits 27, 28 and 29. Each synchronous detector circuit will receive the response signal from the device 14 and will receive a signal from a frequency shifting circuit. If these two signals differ in frequency no output will appear from the synchronous detector circuits, but in the single instance where the signals are equal in frequency and phase (having both been derived from the same carrier signal), a direct voltage output will appear. The parametric circuits of the responder device and of the frequency shifters may oscillate at either of two modes depending upon unpredictable spurious effects at the time when oscillation commences. The generated signals of the two modes of oscillation differ from each other by a 180° phase difference or phase reversal. This 180° phase ambiguity associated with parametric oscillators may change the polarity of the direct voltage output from the terminals 55, 56, 57 etc. (or in the case of FIGURE 1 from the terminals 33, 34 and 35). Thus, subsequent circuitry which may be coupled to the output terminals must be sensitive to voltages which are either positive or negative. This may easily be accomplished by means such as full wave rectification.

The synchronous detector circuits may be as shown in FIGURE 3, each having two input terminals 73 and 74 for receiving the two signals to be compared. Although, with signals of the proper levels, it is of no consequence which signal is impressed upon either of the two input terminals 73 and 74. We may assume, for example, that the signal from a frequency shifter 30, 31 or 32 is impressed upon the terminal 74, and the signal from the responder device 14 passed via the amplifier 26 will be impressed upon the terminal 73. The reference signal, received by the terminal 74, is coupled to the base electrode of a transistor 75 by a resistor 76. The emitter electrode of the transistor 75 is directly connected to ground or the zero reference potential; and therefore, the transistor will be cut off whenever the instantaneous value of the reference signal from a terminal 74 becomes positive in polarity. On the other hand, when the instantaneous value of the reference signal becomes negative, the transistor 75 will be biased into conduction and into saturation. During the conductive intervals of the transistor 75 the potential at a point 77, directly connected to the collector electrode thereof will be substantially reduced to ground or the zero reference potential—the potential drop across the transistor 75 during conduction being such a small quantity that it may be neglected. On the other hand, during those intervals when the transistor 75 is cut off the point 77 becomes isolated from ground or the zero reference potential, and during these times the signal impressed upon the terminal 73 may pass via two coupling resistors 78 and 79 to the output terminal 80. A capacitor 81 coupled to the output terminal 80 provides a filtering and integration such that the output signal appearing on the lead 80 will be of low frequency or of a direct potential level.

The transistor 75 becomes conductive and non-conductive during the successive half cycles of the wave applied to the input terminal 74. During the periods of non-conduction the signal from the input terminal 73 passes to the integrating capacitor 81. If the two signals impressed upon the terminals 73 and 74 are of different frequencies, then different portions of the wave applied to the terminal 73 will be successively impressed upon and integrated by the capacitor 81, and the net or average value stored by the capacitor 81 will be zero. On the other hand, if the signals impressed upon the terminals 73 and 74 are equal in frequency and are in phase with each other (both having been derived from the carrier frequency by similar circuits) then the chopping action of the transistor 75 will result in identical half waves of the signal 73 being continually applied to the integrating capacitor 81. In this case, the circuit of FIGURE 3 may act as a half wave rectifier to charge the capacitor 81 tnd to produce an output voltage level at the terminal 80.

The circuit of FIGURE 1 will provide an interrogator-responder signalling system having a limited number of uniquely coded responder devices for identification of a limited number of vehicles, employee badges, or the like. Each of the various responder devices 14 will cause a unique shift or change in the interrogator carrier frequency which may be detected by comparison with the several outputs of frequency shifting circuits by synchronous detector circuits. Obviously, the number of response frequencies available in such a system is limited by the spectrum of frequencies available and by the accuracy of detection and separation of the adjacent response frequencies which may be used. The interrogator-responder signalling system of FIGURE 5 is somewhat more sophisticated and will provide a system having many more uniquely coded combinations of response signals whereby the capacity of the system may be substantially increased.

In the system of FIGURE 5, the responder device 14″ constitutes a parametric oscillator similar to that shown by FIGURE 2, whereby the response frequency equals ½ of the interrogator carrier frequency. In this case, the response signal is modulated by a unique combination of sub-carrier frequencies identifiable with the particular responder device 14″. The oscillator 11 generates the interrogator carrier signal which is passed via the power amplifier 12 and loop 13 to the responder device 14″. Simultaneously, the further oscillators 37, 38 and 39 generate modulating frequencies which are passed to a summing amplifier 40 by summing resistors 83, 84 and 85. The summing amplifier 40 may be an operational amplifier as used in analog computing circuits and including a feedback resistor 86. A power amplifier 41 and loop 42 will pass a signal comprising the combined oscillations of all of the oscillators 37, 38 and 39. A selected two of the oscillator frequencies are picked up by the tuned circuits 44–45 and 46–47 in the response block 14″. It has been proposed that an interrogator responder signalling system in accordance with FIGURE 5 may use a principal interrogator carrier signal (generated by the oscillator 11) of 13.5 megacycles which lies in an Industrial-Scientific-Medical band of the radio spectrum. The modulating frequencies generated by the oscillators 37, 38 and 39 may be of the order of 100 to 300 kilocycles or in the low frequency band of the radio spectrum. The response signal would then be a very low power signal of 6.75 megacycles modulated by a selected two of the sub-carriers in the 100 to 300 kilocycle band.

A frequency shifter circuit 88 may be generally constructed in accordance with FIGURE 4, but with the omission of the tuned circuit 67–68, since the response signal frequency in this case will equal the idler frequency. The synchronous detector circuit 49 may be as shown in FIGURE 3 but with an integrating capacitor 81 having a value so chosen that the output signal which is passed to the amplifier 50 will include the selected low frequencies from the oscillators 37, 38 and 39. The synchronous detector circuits 51, 52 and 53 may also be as shown in FIGURE 3 to generate output voltage levels when a frequency passed by the amplifier 50 coincides with a particular frequency from the oscillators 37, 38 and 39.

Whereas FIGURE 5 shows but 3 modulating frequency oscillators 37, 38 and 39, it may be appreciated that an actual interrogator-responder signalling installation would use many more than the 3 oscillators shown. For example, if 15 low modulating frequency signals were generated and passed by the amplifier 41 and loop 42, the selection of a particular two of the 15 frequencies would constitute a "two-out-of-15" code. Such a code would provide 105 unique combinations by the selection of any two of 15 possible frequencies. The system could be expanded to include further unique combinations by the addition of further oscillators and further modulating frequencies; or by providing responder devices having two or more similar parametric oscillation circuits such that more than one unique coded response frequency would be available; or by providing responder devices with more than two low-frequency pick-up circuits. Thus, by the use of 15 modulating frequencies of which two are selected by each of two parametric oscillator circuits of a response block, a total of more than 10,000 unique combinations will be available for identification of vehicles, employee badges and the like.

FIGURE 5 illustrates an interrogator-responder signalling system wherein each interrogator station includes two transmitter loops and one receiver loop. Such an arrangement has proven workable in transmitting two separate signals and in receiving a modulated response signal. The modulating frequency signals are not modulated upon the carrier signal at the interrogator station, but both are transmitted separately to be received separately by the responder devices. This system is advantageous since the unmodulated carrier signal may lie entirely within the rather narrow Industrial-Sceintific-Medical band of frequencies allotted by the Federal Communications Commission of the United States Government. The separately transmitted sub-carrier signals of the low frequency band may be of such reduced power as to be permissible under specifications required by the Federal Communications Commission. Since both of the antenna loops 13 and 42 must be tuned to separate and very diverse frequencies it is deemed advisable to make the transmissions from separate loops which may be tuned each to their respective frequency.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. In an interrogator-responder signalling system, a responder device comprising a first tuned circuit for receiving an interrogator signal of a first frequency, a second tuned circuit for transmitting a response signal of a second frequency, and a diode circuit coupled between the first tuned circuit and the second tuned circuit, said diode circuit being operable to vary the effective capacitance of both tuned circuits whereby oscillations are sustained in the second tuned circuit resulting from a pumping of energy from the first tuned circuit through the diode.

2. In an interrogator-responder signalling system, a responder device comprising a first tuned circuit for receiving an interrogator signal of a first frequency, a second tuned circuit for transmitting a response signal of a second frequency, a diode circuit coupled between the first tuned circuit and the second tuned circuit operable to vary the effective capacitance of both tuned circuits and to pump energy to the second tuned circuit to sustain oscillations therein, and a third tuned circuit being tuned to an idler frequency, the summation of the second frequency and the idler frequency being equal to the value of the first frequency.

3. In an interrogator-responder signalling system, a responder device comprising a first tuned circuit for receiving an interrogator signal of a first frequency, a second tuned circuit for transmitting a response signal of a second frequency, a diode circuit coupled between the first tuned circuit and the second tuned circuit operable to vary the effective capacitance of both tuned circuits and to pump energy to the second tuned circuit to sustain oscillations therein, and at least one other tuned circuit for receiving a low frequency signal coupled between the first and the second tuned circuits whereby the response signal is modulated with the low frequency.

4. In an interrogator-responder signalling system, a responder device comprising a first circuit tuned to a pump frequency for receiving an interrogator signal of a first frequency, a second tuned circuit for transmitting a response signal of a second frequency, a diode circuit coupled between the first tuned circuit and the second tuned circuit operable to vary the effective capacitance of both tuned circuits and to pump energy to the second tuned circuit to sustain oscillations therein, and at least one other tuned circuit for receiving a low frequency signal coupled between the first and the second tuned circuits, the second tuned circuit being tuned to a frequency equal to ½ of the pump frequency whereby the response signal will be of a frequency equal to ½ of the interrogator signal and will be modulated with the low frequency.

5. An interrogator-responder signalling system comprising an interrogator station and a responder device movable into spaced relation with the interrogator station, said interrogator station including a means for generating an interrogator signal of a first frequency and a means for receiving a response signal of a second frequency, said responder device including a first tuned circuit for receiving the interrogator signal of the first frequency, a second tuned circuit for transmitting the response signal of the second frequency and a parametric means coupled between the first tuned circuit and the second tuned circuit for passing energy therebetween to sustain oscillation in the second tuned circuit, said interrogator station receiving means including a synchronous detector coupled to receive the response signal, and a frequency changing means coupled between the interrogator signal generating means and the synchronous detector.

6. An interrogator-responder signalling system comprising an interrogator station and a response device movable into spaced relation with the interrogator station, said interrogator station including a means for generating a first interrogator signal having a first frequency and a means for generating a second signal having a plurality of low frequencies, said responder device including a first tuned circuit for receiving the first frequency of the interrogator signal, a second tuned circuit for generating a response signal of a second frequency, and parametric means coupled between the first tuned circuit and the second tuned circuit for passing energy therebetween to sustain an oscillation in the second tuned circuit, said responder device further including a third tuned circuit tuned to a selected one of the low frequencies and coupled to both the first and the second tuned circuits, said interrogator station further including synchronous detection means for receiving the response signal and for detecting low frequency selected by the third tuned circuit of the responder device.

7. An interrogator-responder signalling system comprising an interrogator station and a response device movable into spaced relation with the interrogator station, said interrogator station including a means for generating an interrogator signal having a first frequency and a means for generating a second signal having a plurality of low frequencies, said responder device including a first tuned circuit for receiving the first frequency of the interrogator signal, a second tuned circuit for generating a response signal of another frequency, and parametric means coupled between the first tuned circuit and the second tuned circuit for passing energy therebetween to sustain an oscillation in the second tuned circuit, said responder device further including a third tuned circuit tuned to the frequency of a selected one of the low frequencies and coupled to both the first and the second tuned circuits, said interrogator station further including means for receiving the response signal, frequency changing means coupled to the means for generating the first frequency, a synchronous detector circuit coupled to both the response signal receiving means and the frequency changing means and operable to demodulate the response frequency to obtain the sub-carrier frequency signal selected by the third tuned circuit of the responder device.

8. The interrogator responder signalling system in accordance with claim 7 wherein the frequency changing means comprises a first tuned circuit tuned to the first frequency of the interrogator signal and coupled thereto, a second tuned circuit tuned to the frequency of the response signal, and parametric means coupled between the first tuned circuit and the second tuned circuit for passing energy therebetween to sustain oscillation by pumping the second tuned circuit.

9. An interrogator-responder signalling system comprising an interrogator station and a response device movable into spaced relation with the interrogator station, said interrogator station including a means for generating an interrogator signal having a first frequency and a means for generating a second signal having a plurality of low frequencies, said responder device including a first tuned circuit for receiving the first frequency of the interrogator signal, a second tuned circuit for generating a response signal of another frequency, and parametric means coupled between the first tuned circuit and the second tuned circuit for passing energy therebetween to sustain an oscillation in the second tuned circuit, said responder device further including a third tuned circuit tuned to the frequency of a selected one of the low frequencies and coupled to both the first and the second tuned circuits, said interrogator station further including means for receiving the response signal, frequency changing means coupled to the means for generating the carrier frequency, a first synchronous detector circuit coupled to both the response signal receiving means and the frequency changing means and operable to demodulate the response frequency to obtain a low frequency selected by the third tuned circuit of the responder device, and a plurality of further synchronous detector circuits each coupled to the first synchronous detector circuit and a corresponding one of the sub-carrier frequencies and operable to develop a direct voltage for indicating the low frequency selected by the third tuned circuit of the responder device.

References Cited by the Examiner
UNITED STATES PATENTS

| | | | |
|---|---|---|---|
| 2,443,094 | 6/48 | Carlson et al. | 330—7 |
| 3,048,783 | 8/62 | Warren et al. | 330—4.9 |
| 3,054,100 | 9/62 | Jones | 343—6.5 |

OTHER REFERENCES

RCA Review, March 1959, pp. 3–17, "Nonlinear-Capacitance Amplifiers," by L. S. Nergaard.

CHESTER L. JUSTUS, *Primary Examiner.*